(12) United States Patent
Tyckowski

(10) Patent No.: US 6,555,982 B2
(45) Date of Patent: Apr. 29, 2003

(54) METHOD AND SYSTEM FOR DETECTING AN OBJECT IN THE PATH OF AN AUTOMOTIVE WINDOW UTILIZING A SYSTEM EQUATION

(75) Inventor: Joseph Tyckowski, Clawson, MI (US)

(73) Assignee: Meritor Light Vehicle Technology, L.L.C., Troy, MI (US)

( * ) Notice: Subject to any disclaimer, the term of this patent is extended or adjusted under 35 U.S.C. 154(b) by 67 days.

(21) Appl. No.: 09/867,005

(22) Filed: May 29, 2001

(65) Prior Publication Data

US 2002/0180390 A1 Dec. 5, 2002

(51) Int. Cl.$^7$ ................................................. G05B 5/00
(52) U.S. Cl. ........................ 318/465; 388/815; 388/833; 388/903
(58) Field of Search .................................. 318/266, 282, 318/286, 446, 455, 465, 469, 473, 474; 388/815, 833, 903; 49/28

(56) References Cited

U.S. PATENT DOCUMENTS

| 5,596,253 | A | * | 1/1997 | Mizuta et al. | 318/469 |
| 5,729,104 | A | * | 3/1998 | Kamishima et al. | 318/446 |
| 6,064,165 | A | * | 5/2000 | Boisvert et al. | 318/465 |
| 6,100,658 | A | * | 8/2000 | Kume et al. | 318/286 |

\* cited by examiner

*Primary Examiner*—Khanh Dang
(74) *Attorney, Agent, or Firm*—Carlson, Gaskey & Olds

(57) ABSTRACT

The presence of an object in the path of an automotive vehicle window is detected. This is accomplished by sensing or observing a system variable, such as speed or motor current, and comparing this measured value to a predicted limit value of the system variable which is based upon the behavior of the system variable when there is no object present. The values are compared over predetermined time intervals and if the measured value falls out of the predicted limit value of the system variable in a direction that indicates an obstruction, then a control system detects the presence of an object and reacts accordingly by stopping or reversing the drive motor of the vehicle window.

22 Claims, 1 Drawing Sheet

US 6,555,982 B2

METHOD AND SYSTEM FOR DETECTING AN OBJECT IN THE PATH OF AN AUTOMOTIVE WINDOW UTILIZING A SYSTEM EQUATION

BACKGROUND OF THE INVENTION

This invention relates to a method and system for detecting an obstructing element in the path of an automotive vehicle window. This is accomplished by sensing or observing a system variable, such as speed or motor current, and comparing this measured value to a predicted value of the system variable, which is determined by way of a system equation, in order to determine the presence of an obstructing object.

Vehicles are provided with closures to close openings. Typically, these closures are powered by an electric motor to move between open and closed positions within a frame. Such closures include side windows, moon roofs, sunroofs, etc. Typically, an operator actuates a switch and the closure will move to a fully closed position. In this disclosure, a side window is disclosed. However, it should be understood that the invention applies to all closures, such as moon roofs, sunroofs, etc.

If an object is in the path of the closure, such as a passenger's arm, the prior art would like closure movement to stop or even be reversed. Thus, various systems have been proposed to monitor characteristics of operation during closure to identify the obstruction. Typically, characteristics of the motor are sensed.

It is known that detailed system equations can identify the presence of an object by looking at a number of system variables. However, such equations are of limited value in that there are too many unknowns which are unique to each closure system. Various aspects such as the particular tolerances within the closure system, temperature, age, etc. affect how each individual system will respond.

Thus, there exists a need for an accurate yet simple algorithmic system for identifying the presence of an object in the path of a vehicle closure.

SUMMARY OF THE INVENTION

The present invention observes a system variable, x, such as speed or motor current, to determine the presence of an object. A system equation is used to predict a value of the observed variable as it would normally behave without the presence of an object. This predicted value ($x_p$) is compared to a measured value ($x_m$) of the observed variable. If the measured value ($x_m$) exceeds the predicted value ($x_p$) by some limit, in the direction indicative of an object, then the control system detects an object and reacts accordingly, typically by stopping or reversing the motor.

The present invention also uses a correction mechanism to account for inaccuracies in the system equation. A system equation may not be accurate due to variability between systems and changes due to temperature and aging. In addition, the system equation is adapted over time to also account for these inaccuracies.

These and other features of the present invention can be best understood from the following specification and drawings.

DETAILED DESCRIPTION OF THE DRAWINGS

Figure 1:
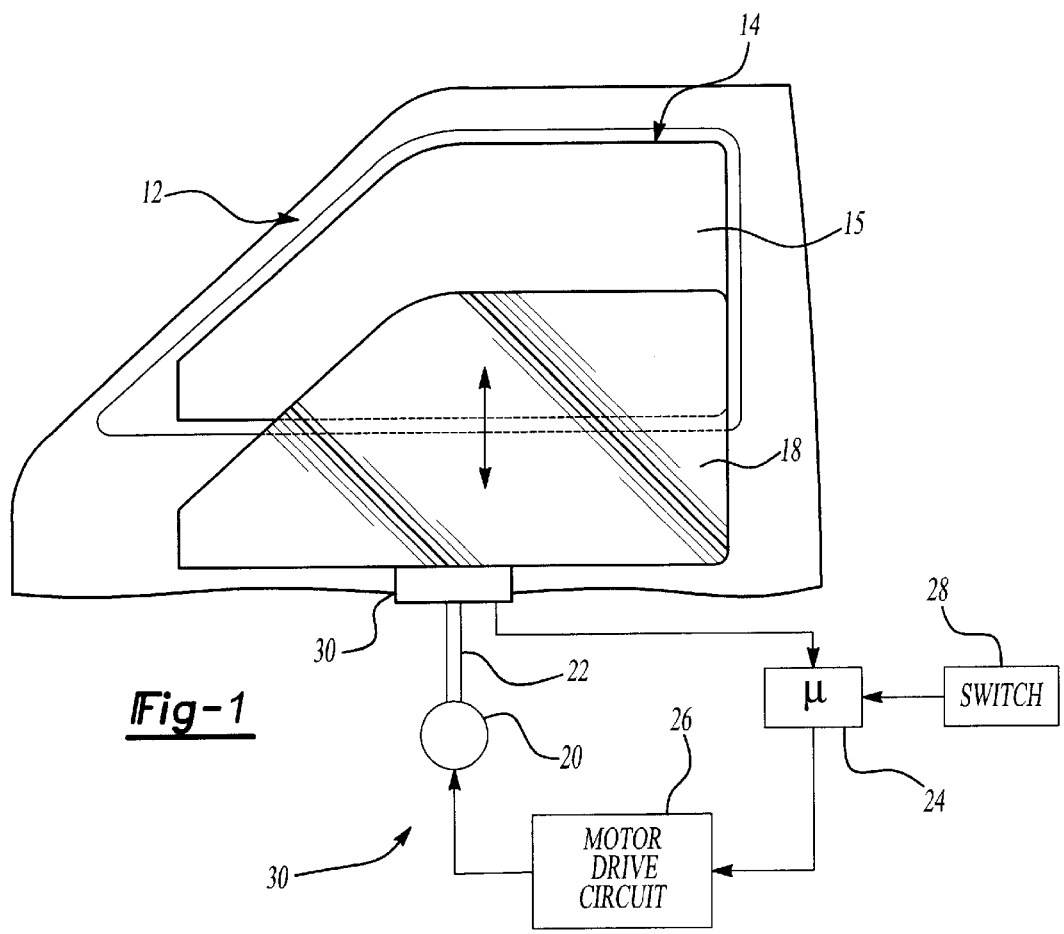
FIG. 1 is a schematic block diagram of a power window system incorporating the object detection method of the present invention.

FIG. 1 shows a power window system 10 incorporating the object detection method of the present invention. An automotive vehicle has a door 12 and a window frame 14 defining a window opening 16. While a side window is shown, the term "window" as used in this application also extends to rear windows, moon roofs, sunroofs, or other vehicle closure components.

The door 12 is equipped with a window glass 18 movable elevationally within the window opening 16 and a drive motor 20 linked with a regulator 22 for driving the window glass 18 upward and downward. Microprocessor, or digital control circuit, 24 controls the drive motor 20 via motor drive circuit 26 in response to signals from switch 28 that commands upward/downward movement of the window glass 18. Digital control circuit 24 is further in communication with a sensor which measures a predetermined variable value of the motor such as speed or motor current.

The dynamic behavior of a power window system can be described utilizing a discrete dynamic system equation generalized as follows:

$$b_0 \cdot x_0 + b_1 \cdot x_1 + b_2 \cdot x_2 + \ldots + b_i \cdot x_i + \ldots + b_n \cdot x_n = B_V(V_m) + B_0(z) + B_{obj} \cdot F_{obj} \quad \text{Equation 1}$$

Where, $x_0$ is the present value of the observed variable (speed or current) at the calculation or sampling interval $x_1$ is the previous value $x_2$ is the second previous value $x_i$ is the "i-th" previous value $x_n$ is the "n-th" previous value $b_0, b_1, b_2, b_i$ Are the coefficients to the observed variable $B_V(V_m)$ is the motor voltage term $B_0(z)$ is the constant load term that can vary with position, z $B_{obj} \cdot F_{obj}$ is the object force term The number of discrete values of x depend on the order of the system or the required accuracy. The highest value is $x_n$. The coefficients, $b_0, b_1, b_2, \ldots, b_i, \ldots$ and $b_n$, are derived from the calculation interval and system parameters such as resistance, inductance, inertia and viscous damping. The terms, $B_V(V_m)$, $B_0(z)$, are $B_{obj} \cdot F_{obj}$, are forcing functions.

Equation 1 can be derived from the continuous time equation using the appropriate transform. Equation 1 is in a form that is easily realized in a microprocessor or digital control circuit 24.

In order for Equation 1 to be used to predict the observed variable, x, it must be rewritten to the form of Equation 2.

$$x_{p0} = (B_V(V_m) + B_0(z) - b_1 \cdot x_{p1} - b_2 \cdot x_{p2} - \ldots - b_i \cdot x_{pi} - \ldots - b_n \cdot x_{pn})/b_0 \quad \text{Equation 2}$$

Equation 2 is used to predict the value of the observed variable x, ($x_p$). The subscript "p" denotes predicted values. Equation 2 calculates the present value of $x_{p0}$ based on previous calculated (predicted) values ($x_{p1}, x_{p2}, x_{pi}, x_{pn}$), forcing terms $B_V(V_m)$ and $B_0(z)$ and assumes that no object is present ($F_{obj}=0$).

The coefficients ($b_0, b_1, b_2, \ldots, b_i, \ldots b_n$), and forcing functions $B_V(V_m)$ and $B_0(z)$ are chosen in such a manner such that $x_{p0}$ tends in a direction that the actual value ($x_{m0}$) would tend when an object is encountered. For the case of observing speed, speed reduces when an object is encountered. These coefficients can be selected to cover a wide range of systems.

Figure 2:
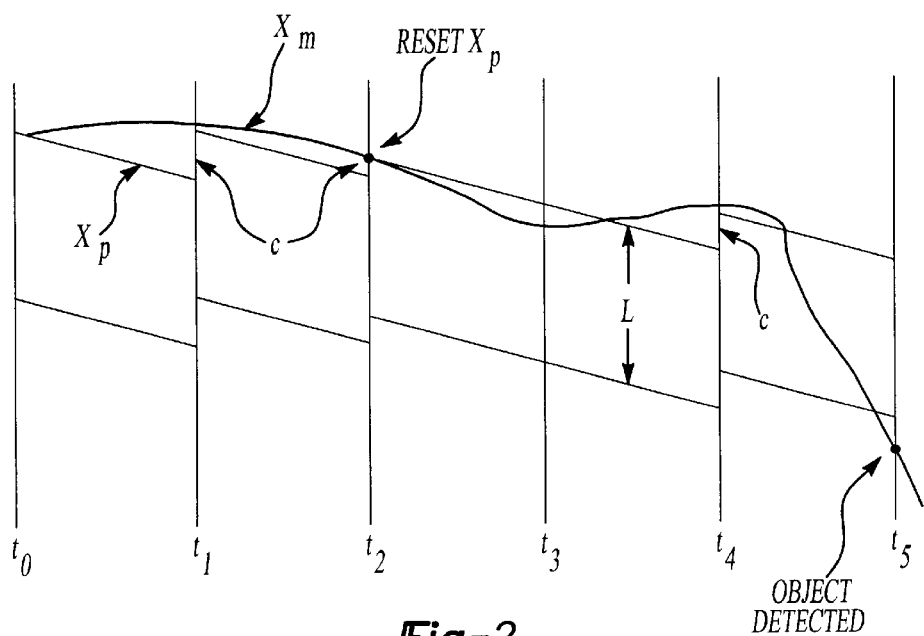
FIG. 2 is a graph illustrating the algorithmic comparison of the measured observed variable to the predicted variable over a series of time intervals as an object is detected.

The graph illustrated in FIG. 2 depicts the behavior of the algorithm some time after the beginning of motion. The initial starting period will be considered later. In this example, speed is considered.

Referring to FIG. 2, the predicted values ($x_p$) and measured values ($x_m$) are assumed to be equal at time $t_0$. As the window closes, if the predicted value ($x_p$) becomes less than the measured value ($x_m$) then a correction, c, is added to $x_p$. This is shown at times $t_1$ and $t_4$. If the $x_p+c$ exceeds $x_m$, then $x_p$ is reset to $x_m$. Specifically, $x_{p0}=x_{m0}$, $x_{p1}=x_{m1}$, $x_{p2}=x_{m2}$, . . . , $x_{pi}=x_{mi}$, . . . , $x_{pn}=x_{mn}$. This is shown at time $t_2$. If $x_p$ is greater than $x_m$, then no correction is added. This is shown at time $t_3$. If $x_m$ becomes much less than $x_p$ by some limit L, then an object is detected. This is shown at time $t_5$.

The algorithm, which may be realized in a microprocessor or digital control circuit, can be summarized as follows:

Begin computation to determine if start period is ended and if calculation interval is ended;

Calculate present predicted value $x_{p0}$;

Measure present value $x_{m0}$;

Determine correction:

If $x_{p0}+c<x_{m0}$ then correct $x_{p0}$ $$\{x_{p0}=x_{p0}+c\}$$

Else if $x_{p0}+c>=x_{m0}$ then reset $x_{p0}$ to $x_{m0}$ $$\{x_{pi}=x_{mi}, \text{ for } i++=0 \text{ to } n\}$$

Else if $x_{p0}>x_{m0}$ then do nothing ($x_{p0}=x_{p0}$)

Check for object:

If $x_{m0}<(x_{p0}-L)$ then object is detected

Advance variables:

$$x_{p(i+1)}=x_{pi} \text{ for } i{-}{-}{=}n{-}1 \text{ to } 0$$

$$x_{m(i+1)}=x_{mi} \text{ for } i{-}{-}{=}n{-}1 \text{ to } 0$$

End.

The correction value can be function of position and time. It may be another dynamic equation.

The correction mechanism allows for the use of a lower order prediction equation (Equation 2). Further, the correction mechanism may allow for the elimination of the measurement of some variables such as motor voltage. This may be calculated from the values obtained in the initial movement.

Equation 2 needs to be initialized at the beginning of each closing motion. This can be done in 2 ways. The first is for the variable $x_{p1}, x_{p2}, \ldots x_{pi}, \ldots x_{pn}$, to be set to values that the observed variable would be at just prior to motion. For speed and current, this is typically zero. Alternatively, the variables $x_{p1}, x_{p2}, \ldots x_{pi}, \ldots x_{pn}$, can be set to $x_{m1}, x_{m2}, \ldots x_{mi}, \ldots x_{mn}$ some time after motion has begun ($x_{pi}=x_{mi}$). This however assumes that there is no object present before the setting of the variables.

The accuracy of Equation 2 can be increased by modifying the coefficients, $b_0, b_1, b_2, \ldots b_i, \ldots b_n$, and forcing functions $B_V(V_m)$ and $B_0(z)$. This is done by solving for these coefficients and functions from the measured values ($x_m$), after the successful closure of the window without an object detected.

Once the coefficients have been determined in this manner, they can be utilized for subsequent operations.

Preferred embodiments have been disclosed. However, a worker in this art would recognize that modifications would come within the scope of this invention. Thus, the following claims should be studied to determine the scope and content of this invention.

What is claimed is:

1. A method for detecting the presence of an object caught between a closure and its respective frame of a power system comprising:

providing a closure for opening and closing via a regulator driven by an electric drive motor controlled by a control circuit;

calculating a predicted variable parameter value utilizing a system equation, said system equation including a number of coefficients which are multiplied by a number of different parameter values measured over a period of time, such that said predicted variable parameter value for any one of a series of different times is based upon a plurality of measured parameter values measured over a period of time;

sensing a variable parameter value of the power system during closing of the closure;

comparing said sensed variable parameter value to a previously predicted variable parameter value based upon a presumption of how said predicted variable parameter value would behave without the presence of an object; and detecting an object caught between the closure and its respective frame based on the result of the compared parameter values.

2. The method as recited in claim 1, wherein the closure is a side window mounted in a vehicle door frame.

3. The method as recited in claim 1, wherein the sensed or predicted parameter is the speed of said drive motor.

4. The method as recited in claim 1, wherein said parameter values are compared at predetermined time intervals, and at the beginning of each of said time intervals a correction mechanism is incorporated to adjust the predetermined limit when the sensed variable parameter value falls out of said predetermined limit in a direction opposed to that which indicates the presence of an object.

5. The method as recited in claim 4, wherein said correction mechanism is a value based on another dynamic system equation.

6. The method as recited in claim 1, wherein said coefficients are calculated utilizing information from a movement cycle of said closure wherein no object is detected, and utilizing sensed parameter values during said movement cycle to calculate said coefficients.

7. The method as recited in claim 1, wherein said coefficients are selected to err on the side of predicting a value in a direction towards which said parameter will move when an object is encountered.

8. The method as recited in claim 1, wherein said equation is initialized by setting said predicted limits utilized in said equation to be values that the observed parameter will be just prior to motion.

9. The method as recited in claim 1, wherein said predicted values are initialized by values taken from actual values after motion.

10. The method of claim 4, wherein a correction mechanism not being utilized to adjust when the sensed variable parameter value falls out of said predetermined limit in a direction consistent with the indication of the presence of an object.

11. A method as set forth in claim 1, wherein at least some of said variable parameter values during different periods during the movement, occur during a current path of movement of said closure.

12. A power closure system comprising:

a closure opening and closing via a regulator that is driven by an electric drive motor which is controlled by a motor control circuit;

a sensor for sensing a variable parameter value of the power system; and a digital control circuit in communication with said sensor for comparing the sensed variable parameter value during closing of the closure to a previously predicted variable parameter value calculated utilizing a system equation which includes coefficients multiplied by parameter values from various locations through a path of movement of said closure and providing an indication of how said predicted variable parameter value would behave without the presence of an object in order to detect an object caught between the closure and its respective frame based on the result of the compared parameter values.

13. The system as recited in claim 12, wherein the closure is a side window mounted in a vehicle door frame.

14. The system as recited in claim 12, wherein the sensed or predicted parameter is the speed of said drive motor.

15. The system as recited in claim 12, wherein said parameter values are compared at predetermined time intervals, and at the beginning of each of said time intervals a correction mechanism is incorporated by way of said digital control circuit to adjust the predetermined limit when the sensed variable parameter value falls out of said predetermined limit in a direction opposed to that which indicates the presence of an object.

16. The system as recited in claim 15, wherein said correction mechanism is a value based on another dynamic system equation.

17. The system as recited in claim 12, wherein said coefficients are calculated utilizing information from a movement cycle of said closure wherein no object is detected, and utilizing sensed parameter values during said movement cycle to calculate said coefficients.

18. The system as recited in claim 12, wherein said coefficients are selected to err on the side of predicting a value in a direction towards which said parameter will move when an object is encountered.

19. The system as recited in claim 12, wherein said equation is initialized by setting said predicted limits utilized in said equation to be values that the observed parameter will be just prior to motion.

20. The system as recited in claim 12, wherein said predicted values are initialized by values taken from actual values after motion.

21. The system as recited in claim 15, wherein said digital control circuit not being utilized to adjust when the sensed variable parameter value falls out of said predetermined limit in a direction consistent with the indication of the presence of an object.

22. A system as set forth in claim 12, wherein at least some of said variable parameter values during different periods during the movement, occur during a current path of movement of said closure.

* * * * *

Adverse Decision in Interference

Patent No. 6,555,982, Joseph Tyckowski, METHOD AND SYSTEM FOR DETECTING AN OBJECT IN THE PATH OF AN AUTOMOTIVE WINDOW UTILIZING A SYSTEM EQUATION, Interference No. 105,566, final judgment adverse to the patentee rendered May 13, 2008, as to claims 1-3, 6, 9, 11-14, 17, 20 and 22.

*(Official Gazette July 22, 2008)*